United States Patent Office 2,885,377
Patented May 5, 1959

2,885,377

LIGHT STABLE HALOGEN-CONTAINING RESINS CONTAINING PHOSPHATE ESTER AND AN ARYL ALKANE SULFONATE

William S. Knowles, Kirkwood, Mo., and Joachim Dazzi, Dayton, Ohio, assignors to Monsanto Chemical Company, St. Louis, Mo., a corporation of Delaware No Drawing. Application June 28, 1954
Serial No. 439,882

10 Claims. (Cl. 260—30.6)

This invention relates to light stable halogen-containing resin compositions and a method for preparing same. More particularly this invention relates to the prevention of light deterioration manifested by darkening of halogen-containing resins, plasticized with aryl alkane sulfonates.

In recent years aryl alkane sulfonates have found considerable use as plasticizers for halogen-containing resins and more specifically for vinyl chloride polymer compositions. Such polymeric compositions have been found to be exceedingly flexible at low temperatures, particularly so at a temperature as low as $-25°$ C. to $-35°$ C. These aryl alkane sulfonate plasticizers are aryl esters of alkyl sulfonic acids and are generally prepared by reacting a phenol with an alkane sulfone chloride in the presence of an alkaline material such as ammonia or sodium hydroxide. The alkane sulfone chloride may be obtained from the sulfochlorination of saturated straight chained, or saturated branched chained hydrocarbons or mixtures thereof obtained from petroleum hydrocarbon or synthesized hydrocarbons such as the hydrogenated products obtained from the Fischer-Tropsch synthesis. The aryl alkane sulfonates preferred as plasticizers for vinyl halide containing resins are those containing from 6 to 24 carbon atoms in the alkane groups. Although the aryl component of these aryl alkane sulfonates is generally the phenyl group, such esters wherein the aryl group is a tolyl, xylyl, ethylphenyl, naphthyl, biphenyl, halogen substituted aryl groups and the like can also be used as plasticizers.

Halogen-containing resins and especially vinyl halide containing resins plasticized with aryl alkane sulfonates are especially useful for the manufacture of hose, upholstering fabrics and plastic uppers for footwear because of the extreme low temperature, flexible properties of these plastic materials. These articles of manufacture are subjected to sunlight for many hundreds of hours during their life and consequently, light deterioration principally manifested in increasing darkening but also in the formation of a tacky surface is undesirable. Even resorting to the use of large quantities of pigments does not mask the darkening effect. White and pastel colored fabrics prepared from vinyl halide containing resins plasticized with aryl alkane sulfonates heretofore could not be prepared because of the light deterioration. Since the light colored vinyl halide containing plasticized compositions are more desirable for upholstering fabrics and footwear, the light stabilization of such compositions is highly desirable and would be extremely useful.

It has now been discovered that the light degradation of halogen-containing resins and especially vinyl halide containing resins, plasticized with aryl alkane sulfonates, can be substantially, completely eliminated by adding thereto as a light stabilizing plasticizer a mixed triester of phosphoric acid wherein one ester group contains an aryl group, one ester group contains an alkyl and a third ester group contains either an aryl or alkyl group. Light stabilization can be achieved by employing from about 10% to 90% by weight of the mixed triester based on the total plasticizer used. The beneficial results produced by following the practices of this invention can be achieved by incorporating with the resin in any order the aryl alkane sulfonates and the mixed triester, or the aryl alkane sulfonates and the mixed triester can be first combined and the resulting mixture employed as the plasticizer for the resin. The usual procedure for preparing a plasticized halogen-containing resin is employed. For example, the resin, the mixed triester and the aryl alkane sulfonatse are mixed together to form a dough and this dough placed on a heated roll mill and there blended together with any other ingredients until the resin is fused. Usually, the mixing and fusing is carried out on the rolls of a differential speed two-roll mill whose rolls are heated to a temperature of from $150°$ to $165°$ C. and the resulting composition is left on the mill for 5 to 10 minutes after the composition has become fused.

As above stated, mixtures of the two plasticizers in the ratio of from 10% to 90% by weight of the mixed triester, and from 90% to 10% by weight of the aryl alkane sulfonates are useful. However, for optimum results, i.e. light stabilization for the longest time, it is preferred to employ plasticized mixtures containing from 30% to 70% by weight of the mixed triester, and from 70% to 30% by weight of the aryl alkane sulfonates. Halogen-containing resins and especially vinyl halide containing resins plasticized with a mixture containing equal parts by weight of the mixed triester and the aryl alkane sulfonates, have shown no detectable light deterioration after exposure to ultraviolet light for 1000 hours or more.

Broadly, from about 30 to 100 parts by weight of the mixture of the two plasticizers per 100 parts by weight of polymer may be used. However, from 30 to 60 parts by weight of the plasticizer mixture per 100 parts by weight of polymer are preferred.

Suitable halogen-containing resins which are useful according to this invention include for example polyvinyl chloride as well as resins made from such vinylidene compounds as vinylidene chloride, vinyl chloroacetate, chloro styrenes, chloro butadienes, among others. Such vinyl compounds may be polymerized singly or in a mixture with these or other halogen-containing vinylidene compounds or with vinylidene compounds free from halogen. Among the unsaturated materials free from halogen which may be copolymerized with halogen-containing vinylidene compounds are vinyl esters of carboxylic acids, for example, vinyl acetate, vinyl propionate, vinyl butyrate, vinyl benzoate; esters of unsaturated acids, for example, alkyl acrylates, such as methyl acrylate, ethyl acrylate, propyl acrylate, butyl acrylate, allyl acrylate and the corresponding esters of methacrylic acids; vinyl aromatic compounds, for example styrene, para-ethyl styrene, divinyl benzene, vinyl naphthalene, alpha-methyl styrene; dienes, such as butadiene, unsaturated amides, such as acrylic acid amide, acrylic acid anilide; unsaturated nitriles, such as acrylic acid nitrile; esters of $\alpha,\beta$-unsaturated carboxylic acids, for example, the methyl, ethyl, propyl, butyl, amyl, hexyl, heptyl, octyl, allyl, methallyl, and phenol esters of maleic, crotonic, itaconic, fumaric acids and the like. The class of copolymers in which a predominant portion, i.e., more than 50% by weight, of the copolymer is made from a halogen-containing vinylidene compound such as vinyl chloride represents a preferred class of polymers to be treated according to the invention.

Among the preferred embodiments of the invention is the stabilization of polymers prepared by the copolymerization of vinyl halides, e.g. vinyl chloride with $\alpha,\beta$-unsaturated polycarboxylic acids such as diethyl maleate or other esters of maleic, fumaric, aconitic, itaconic acids, etc. Among the preferred esters of such acids are alkyl esters in which the alkyl group contains not over 8 carbon atoms.

The stabilizer of the invention is also effective when intimately mixed with halogen-containing resins in which part or all of the halogen is introduced into preformed resin, e. g., chlorinated polyvinyl acetate, chlorinated polystyrene, chlorinated polyvinyl chloride, chlorinated natural and synthetic rubbers, rubber hydrochloride, etc.

The stabilizer mixture of the invention is also effective in halogen-containing resins containing halogens other than chlorine, e.g. bromine, fluorine and iodine.

The aryl alkane sulfonates with which this invention is concerned may be the aryl esters of alkane monosulfonates, the aryl esters of alkane polysulfonates or mixtures thereof. Such aryl alkane sulfonates may be represented by the formula,

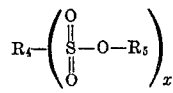

wherein $R_4$ represents an aliphatic radical derived from a hydrocarbon containing saturated straight chain and saturated branched chain hydrocarbons and from 6 to 24 carbon atoms, $R_5$ represents an aryl radical, and $x$ represents an integer. Constituting a particularly useful and preferred embodiment of this invention are those aryl alkane sulfonates having the above formula wherein $x$ represents an integer from 1 to 3 inclusive. The aryl group, $R_5$, can be derived from phenol or mono- or poly-substituted phenols. Thus, the aryl radical in the aryl alkane sulfonate may contain one or more inert substituents of which the following are illustrative: halogens, such as chlorine, bromine, iodine, and fluorine; alkyl groups, such as methyl, ethyl, propyl, isopropyl, butyl, tert.-butyl, etc.; aryl groups, such as tert.-butyl phenyl, etc.; alkoxy groups, such as methoxy, ethoxy, propoxy, isopropoxy, etc.

The aliphatic radical, $R_4$, in the formula above is derived from straight or branched chain hydrocarbons obtained from the hydrogenation of the products of the Fischer-Tropsch hydrocarbon synthesis or from petroleum hydrocarbons. Regardless of the source of hydrocarbon, the saturated hydrocarbon is reacted with chlorine and sulfur dioxide in the presence of light to produce a monosulfone chloride, a polysulfone chloride or a mixture of mono and polysulfone chlorides. The alkane sulfone chloride product is then reacted with a phenol in the presence of sodium hydroxide, ammonia or other alkali to form the aryl alkane sulfonate. The resulting reaction mixture is heated at reduced pressure, about 200 mm. Hg, to a temperature of from about 90° C. to about 100° C. to remove unreacted alkane and then steam blown at a further reduced pressure of about 100 mm. Hg and at about 110° C. The aryl alkane sulfonates derived from non-petroleum sources prepared and treated in this manner are excellent plasticizers for halogen-containing resins and especially for vinyl halide containing resins.

However, the aryl alkane sulfonates whose alkane constituents have been derived from saturated petroleum hydrocarbons are not satisfactory for use after being steam blown and must be further treated before they become suitable for use as plasticizers. These aryl esters of alkane sulfonic acids derived from petroleum hydrocarbons were found to be readily converted to useful plasticizers when heated to a temperature greater than 110° C. and at a reduced pressure of 100 mm. Hg or less following either the heating at 200 mm. Hg to remove the unreacted alkane or following the steam blowing at about 100 mm. Hg. These heat treated aryl alkane sulfonates are excellent plasticizers being not only equal to, but in some respects being superior to those prepared from synthetic hydrocarbons as the source of the alkane $R_4$ group. Furthermore, the aryl alkane sulfonates whose alkane constituents have been derived from petroleum hydrocarbons can be produced at much lower cost than can the aryl esters of alkane sulfonic acids derived from synthetic hydrocarbons such as the hydrogenation products of the Fischer-Tropsch hydrocarbon synthesis.

Since the aryl alkane sulfonates obtained from the reaction of a phenol with an alkane sulfone chloride obtained from petroleum and non-petroleum sources have to undergo heat treatment before they are useful as plasticizers, no distinction will be made between the aryl esters of alkane sulfonic acids derived from petroleum hydrocarbons or synthetic hydrocarbons. As hereinafter employed in the specification and claims, the generic term "aryl alkane sulfonate" as well as the specific terms such as "phenyl $C_{16}$ alkane sulfonate," "cresyl $C_{10}$–$C_{12}$ alkane sulfonate" among others will be used to indicate the ester product after its heat treatment according to its source. That is, these terms are employed hereinafter to indicate the aryl alkane sulfonate which have been converted to useful plasticizers.

The halogen-containing resins may contain a varying proportion of halogen depending upon the nature of the resin and its contemplated use. However, as indicated above, vinyl chloride polymers in which the proportion of vinyl chloride units amounts to 50% or more of the total monomer used in making the polymeric product represents a preferred class of polymers to be stabilized according to the invention.

The mixed triesters with which this invention is concerned can be represented by the following formula,

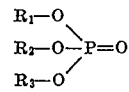

wherein $R_1$ is an alkyl group containing up to 20 carbon atoms, $R_2$ is an aryl group containing 6 to 20 carbon atoms and $R_3$ is either alkyl or aryl containing up to 20 carbon atoms. Thus, these triesters can be monoalkyl diarylphosphates or dialkyl monoarylphosphates. In the dialkyl monoarylphosphates the dialkyl groups can be the same or they can be different alkyl groups but they must, however, contain a total of at least 7 carbon atoms. Likewise, in the monoalkyl diaryl phosphates the diaryl groups can be the same or different aryl groups. Specific members of these two classes of neutral esters of phosphoric acid are hereinafter set forth.

The monalkyl diaryl phosphate esters which can be employed according to this invention include, among others, 2-ethylbutyl diphenyl phosphate
2-methylpentyl dicresyl phosphate
Octyl dicresyl phosphate
2-ethylhexyl dicresyl phosphate
2-ethylhexyl di-p-cresyl phosphate
Iso-octyl dicresyl phosphate
Iso-octyl di-p-cresyl phosphate
2-ethylhexyl diphenyl phosphate
Octyl diphenyl phosphate
Iso-octyl diphenyl phosphate
Nonyl diphenyl phosphate
Trimethylhexyl diphenyl phosphate
Nonyl discresyl phosphate
Decyl dicresyl phosphate
Dodecyl diphenyl phosphate
Dodecyl dicresyl phosphate
2-n-propylheptyl diphenyl phosphate Hexoxyethyl diphenyl phosphate
Butoxyethyl diphenyl phosphate
2-ethylbutoxyethyl dicresyl phosphate
2-methylpentoxyethyl diphenyl phosphate
n-Hexoxyethyl dicresyl phosphate
2-methylpentoxyethyl dicresyl phosphate
Octoxyethyl dicresyl phosphate
2-ethylhexoxyethyl diphenyl phosphate
Iso-octoxyethyl dicresyl phosphate
2-ethylhexoxyethyl dicresyl phosphate
n-Octoxyethyl diphenyl phosphate
Nonoxyethyl dicresyl phosphate
Trimethylhexoxyethyl diphenyl phosphate
n-Decoxyethyl dicresyl phosphate
2-n-propylheptoxyethyl dicresyl phosphate
Decoxyethyl diphenyl phosphate
2-n-propylheptoxyethyl diphenyl phosphate
Dodecoxyethyl diphenyl phosphate
Dodecoxyethyl dicresyl phosphate
Butoxyethyl di-m-cresyl phosphate
2-ethylhexoxyethyl di-m-cresyl phosphate
Butoxyethyl di(o-chlorophenyl) phosphate
2-methylpentyl di( o-chlorophenyl) phosphate
2-ethylhexyl di(o-chlorophenyl) phosphate
2-n-propylheptyl di(o-chlorophenyl) phosphate
Dodecyl di(o-chlorophenyl) phosphate
Tridecyl diphenyl phosphate
Tridecyl di-m-cresyl phosphate
Tridecoxyethyl diphenyl phosphate
Tetradecyl di(o-chlorophenyl) phosphate
Tetradecyl di p-cresyl phosphate
Tetradecoxyethyl diphenyl phosphate
Pentadecyl dicresyl phosphate
Pentadecyl diphenyl phosphate
Pentadecoxyethyl di(p-chlorophenyl) phosphate
Hexadecyl diphenyl phosphate
Hexadecyl di-m-cresyl phosphate
Hexadecoxyethyl di(o-chlorophenyl) phosphate
Heptadecyl diphenyl phosphate
Heptadecyl di-o-cresyl phosphate
Heptadecoxyethyl diphenyl phosphate
Octadecyl di(o-chlorophenyl) phosphate
Octadecoxyethyl dicresyl phosphate
Hexyl phenyl cresyl phosphate
2-methylpentyl phenyl cresyl phosphate
n-Hexyl phenyl cresyl phosphate
Octyl phenyl cresyl phosphate
2-ethylhexyl phenyl cresyl phosphate
n-Octyl phenyl cresyl phosphate
Nonyl phenyl cresyl phosphate
n-Decyl phenyl cresyl phosphate
Lauryl phenyl cresyl phosphate
Butoxyethyl phenyl cresyl phosphate
2-methylpentoxyethyl phenyl cresyl phosphate
Hexoxyethyl phenyl cresyl phosphate
Octoxyethyl phenyl cresyl phosphate
2-ethylhexyloxyethyl phenyl cresyl phosphate
Nonyloxyethyl phenyl cresyl phosphate
Decyloxyethyl phenyl cresyl phosphate
Lauroxyethyl phenyl cresyl phosphate
6-methylheptyl di($\alpha$-naphthyl) phosphate
2-methylpentyl di($\beta$-naphthyl) phosphate
6-methylheptyl di(beta-naphthyl) phosphate
2-ethylhexyl di($\beta$-naphthyl) phosphate
Nonyl di($\beta$-naphthyl) phosphate
2-n-propylheptyl di($\alpha$-naphthyl) phosphate
Dodecyl di($\beta$-naphthyl) phosphate
Tridecyl di($\alpha$-naphthyl) phosphate
Tetradecyl di($\alpha$-naphthyl) phosphate
Hexadecyl di($\beta$-naphthyl) phosphate
Octadecyl di($\alpha$-naphthyl) phosphate
Butoxyethyl di($\beta$-naphthyl) phosphate
n-Hexoxyethyl di($\alpha$-naphthyl) phosphate
2-ethylhexoxyethyl di($\beta$-naphthyl) phosphate
Nonoxyethyl di($\beta$-naphthyl) phosphate
n-Dodecoxyethyl di($\beta$-naphthyl) phosphate
Tridecoxyethyl di($\alpha$-naphthyl) phosphate
Tetradecoxyethyl di($\beta$-naphthyl) phosphate
n-Hexadecoxyethyl di($\alpha$-naphthyl) phosphate
Octadecoxyethyl di($\alpha$-naphthyl) phosphate The dialkyl monoaryl phosphates which can be employed in the present invention include among others:

2-ethylhexyl methyl phenyl phosphate
2-ethylhexyl sec-butyl p-chlorophenyl phosphate
n-octyl n-butyl phenyl phosphate
2-ethylhexyl isobutyl phenyl phosphate
2-ethylhexyl n-butyl phenyl phosphate
2-ethylhexyl sec-butyl cresyl phosphate
2-ethylhexyl n-butyl cresyl phosphate
Di(2-ethylhexyl) phenyl phosphate
Di-n-octyl cresyl phosphate
2-ethylhexyl capryl phenyl phosphate
2-ethylhexyl 2-butyloctyl cresyl phosphate
n-Butyl sec-tetradecyl phenyl phosphate
n-Hexadecyl isopropyl phenyl phosphate While those phosphate esters wherein the alkyl and aryl substituents are unsubstituted constitute a preferred embodiment of this invention, the alkyl and aryl radicals may be substituted with one or more unreactive substituents. Thus the alkyl and aryl radicals may be substituted with nitro groups, aryl groups such as phenyl, alkoxy groups such as ethoxy, butoxy, isopropoxy, methoxy, etc., halogens such as chlorine, bromine, iodine and fluorine, and the aryl groups also may be substituted with alkyl groups such as methyl, ethyl, propyl, isopropyl, butyl, octyl, etc.

The following are specific examples illustrating the compositions of this invention and their stability to light. In these examples all "parts" are parts by weight.

EXAMPLE I

There is stirred together until a dough-like mass is obtained 100 parts of polyvinyl chloride, 25 parts of 2-ethylhexyl diphenyl phosphate and 25 parts of a mixture of phenyl esters of alkane sulfonic acids containing 6 to 12 carbon atoms in the alkane groups. The dough-like mass is placed on a roll mill whose rolls are at 165° C. When the mass begins to fuse 2.0 parts of basic lead silicate and 0.5 part of dibasic lead stearate are added at the bite of the rolls and incorporated by the usual technique of cutting and folding of the fused sheet until a homogeneous fused mass is obtained, and the resulting sheet is milled at 165° C. for about 10 minutes and thereafter cut off and molded under pressure into a sheet 0.04 inch thick. This composition, hereinafter referred to as composition A, is light tan in color.

Following the same procedure as described above there is prepared three other plasticized polyvinyl chloride sheets: Composition B containing 100 parts PVC, 50 parts of the above described phenyl esters of the $C_6$–$C_{12}$ alkane sulfonic acids, 2.0 parts of basic lead silicate and 0.5 part of dibasic lead stearate; and composition C the same as composition A except that the 25 parts of 2-ethylhexyl diphenyl phosphate is replaced with 25 parts of tricresyl phosphate. Composition D is the same as C except that 25 parts of trioctyl phosphate is substituted for the tricresyl phosphate.

From each of composition A, composition B, composition C and composition D there is cut seven test strips. These 28 test strips are subjected to ultraviolet light developed by a carbon arc in a Weatherometer in accordance with ASTM Test D822–46T for various periods of time. The results of these ultraviolet light exposure tests are shown below in Table I.

Table I
ULTRAVIOLET LIGHT TESTS

| Hours Exposed | Color of Test Strips | | | |
|---|---|---|---|---|
| | Composition A | Composition B | Composition C | Composition D |
| 0 | Tan-translucent. | Red brown | Tan-translucent. | Tan-opaque. |
| 135 | ---do------ | Light brown [1] | Tan-clear [1] | Tan-translucent.[1] |
| 280 | ---do------ | Medium brown. | Opaque Tan-red spots. | Brown-tacky. |
| 400 | ---do------ | Dark brown | Very red brown. | Red-brown-tacky. |
| 535 | ---do------ | -----do------ | Almost black | Dark brown-oily. |
| 750 | ---do------ | -----do------ | Black | Almost black. |
| 1,000 | ---do------ | -----do------ | -----do------ | Black. |

[1] Evidence of light bleaching.

From the above results of the light tests with composition B it is apparent that resins plasticized with an aryl ester of an alkane sulfonic acid as the sole plasticizer are not light stable. It is also apparent from the light test with compositions C and D that not all phosphate esters possess the required properties to stabilize the resin aryl alkane sulfonate composition. These results demonstrate that the compositions of this invention such as composition A are exceedingly stable to ultraviolet light.

EXAMPLE II

There is prepared by the procedure described in Example I a sheet of plasticized polyvinyl chloride containing the following ingredients.

| Ingredients: | Parts |
|---|---|
| Polyvinyl chloride | 100 |
| 2-ethylhexyl diphenyl phosphate | 15 |
| Phenyl $C_{16}$ alkane sulfonate | 45 |
| Basic lead silicate | 2.0 |
| Dibasic lead stearate | 0.5 |

Portions of this sheet showed little change in color after 1000 hours exposure to ultraviolet light.

EXAMPLE III

There is proposed by the procedure described in Example I a sheet of plasticized polyvinyl chloride containing the following ingredients.

| Ingredients: | Parts |
|---|---|
| Polyvinyl chloride | 100 |
| 2-ethylhexyl diphenyl phosphate | 15 |
| Phenyl ester of $C_{20}$–$C_{24}$ alkane sulfonates | 15 |
| Basic lead silicate | 2.0 |
| Dibasic lead stearate | 0.5 |

Portions of this sheet showed little change in color after 1000 hours exposure to ultraviolet light.

EXAMPLE IV

There is prepared by the procedure described in Example I a sheet of plasticized polyvinyl chloride containing the following ingredients.

| Ingredients: | Parts |
|---|---|
| Polyvinyl chloride | 100 |
| Basic lead silicate | 2.0 |
| Dibasic lead stearate | 0.5 |
| Cresyl ester of $C_{10}$–$C_{12}$ alkane sulfonates | 25 |
| Di-2-ethylhexyl phenyl phosphate | 25 |

Portions of this sheet remain tan in color even after exposure to ultraviolet light for 1000 hours.

EXAMPLE V

There is prepared by the procedure described in Example I a sheet of plasticized polyvinyl chloride containing the following ingredients.

| Ingredients: | Parts |
|---|---|
| Polyvinyl chloride | 100 |
| Basic lead silicate | 2.0 |
| Dibasic lead stearate | 0.5 |
| Chlorophenyl $C_{16}$ alkane sulfonate | 25 |
| Butoxy-di(o-chlorophenyl) phosphate | 25 |

Exposure to ultraviolet light for as long as 1000 hours produced little or no color change.

EXAMPLE VI

There is prepared by the procedure described in Example I a sheet of plasticized polyvinyl chloride containing the following ingredients.

| Ingredients: | Parts |
|---|---|
| Polyvinyl chloride | 100 |
| Basic lead silicate | 2.0 |
| Dibasic lead stearate | 0.5 |
| Chlorophenyl $C_{16}$ alkane sulfonate | 25 |
| 2-ethylhexyl sec-butyl p-chlorophenyl phosphate | 25 |

This composition showed stability to ultraviolet light as indicated by little or no color change after exposure for as long as 1000 hours.

EXAMPLE VII

There is prepared by the procedure described in Example I a sheet of plasticized polyvinyl chloride containing the following ingredients.

| Ingredients: | Parts |
|---|---|
| Polyvinyl chloride | 100 |
| Basic lead silicate | 2.0 |
| Dibasic lead stearate | 0.5 |
| Phenyl ester of alkane $C_6$–$C_{12}$ sulfonic acids | 25 |
| Dioctyl cresyl phosphate | 25 |

This composition withstood the deteriorating effects of ultraviolet light for as long as 1000 hours.

EXAMPLE VIII

There is prepared by the procedure described in Example I a sheet of plasticized vinyl chloride containing resin in the proportions set forth below:

| Ingredients: | Parts |
|---|---|
| Copolymer of 90 parts by weight vinyl chloride and 10 parts by weight of vinyl acetate | 100 |
| Basic lead silicate | 2 |
| Dibasic lead stearate | 0.5 |
| 2-ethylhexyl diphenyl phosphate | 15 |
| Phenyl $C_{16}$ alkane sulfonate | 45 |

The resulting composition withstood the deteriorating effects of ultraviolet light for as long as 1000 hours.

EXAMPLE IX

There is prepared by the procedure described in Example I a sheet of a copolymer of vinyl chloride containing the following ingredients.

| Ingredients: | Parts |
|---|---|
| Copolymer of 90 parts by weight vinyl chloride and 10 parts by weight of vinylidene chloride | 100 |
| Basic lead silicate | 2 |
| Dibasic lead stearate | 0.5 |
| 2-ethylhexyl diphenyl phosphate | 15 |
| Phenyl $C_{16}$ alkane sulfonate | 45 |

Portions of this sheet showed little change in color after 1000 hours exposure to ultraviolet light.

EXAMPLE X

There is prepared by the procedure described in Example I a sheet of a copolymer of vinyl chloride containing the following ingredients.

Ingredients: Parts
    Copolymer of 90 parts by weight vinyl chloride
        and 10 parts by weight of diethyl maleate__ 100
    Basic lead silicate_____ 2
    Dibasic lead stearate_____ 0.5
    2-ethylhexyl diphenyl phosphate_____ 15
    Phenyl $C_{16}$ alkane sulfonate_____ 45

Portions of this sheet showed little change in color after 1000 hours exposure to ultraviolet light.

This application is a continuation in part of the co-pending application Ser. No. 189,882, filed October 12, 1950, now U.S. Patent 2,684,955.

What is claimed is:

1. An ultraviolet light resistant resin composition which comprises a halogen containing addition polymer of an olefinic compound plasticized with from 30 to 100 parts by weight per 100 parts by weight of polymer of a mixture containing from 10 to 90% of a neutral phosphate ester of the formula

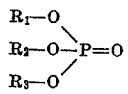

wherein $R_1$ is an alkyl radical containing up to 20 carbon atoms, $R_2$ is an aryl radical containing from 6 to 20 carbon atoms and $R_3$ is selected from the group consisting of an alkyl radical containing up to 20 carbon atoms and an aryl radical containing from 6 to 20 carbon atoms, and correspondingly from 90 to 10% of an aryl alkane sulfonate of the formula

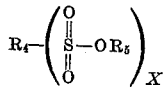

wherein $R_4$ represents a saturated aliphatic hydrocarbon radical containing from 6 to 24 carbon atoms, $R_5$ represents an aryl radical containing from 6 to 12 carbon atoms and X represents an integer.

2. An ultraviolet light resistant resin composition which comprises a halogen containing addition polymer of an olefinic compound plasticized with from 30 to 100 parts by weight per 100 parts by weight of polymer of a mixture containing from 10 to 90% of an alkyl diaryl phosphate of the formula

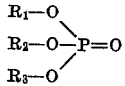

wherein $R_1$ is an alkyl hydrocarbon radical containing up to 20 carbon atoms, and $R_2$ and $R_3$ are aryl hydrocarbon radicals containing from 6 to 20 carbon atoms and correspondingly from 90 to 10% of an aryl alkane sulfonate of the formula

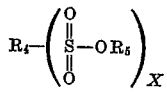

wherein $R_4$ represents a saturated aliphatic hydrocarbon radical containing from 6 to 24 carbon atoms, $R_5$ represents a phenyl radical and X is an integer of from 1 to 3 inclusive.

3. An ultraviolet light resistant resin composition which comprises a halogen containing addition polymer of an olefinic compound plasticized with from 30 to 100 parts by weight per 100 parts by weight of polymer of a mixture containing from 10 to 90% of an aryl dialkyl phosphate of the formula

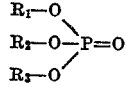

wherein $R_1$ is an aryl hydrocarbon radical containing from 6 to 20 carbon atoms, and $R_2$ and $R_3$ are alkyl hydrocarbon radicals containing up to 20 carbon atoms, and correspondingly from 90 to 10% of an aryl alkane sulfonate of the formula

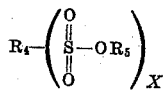

wherein $R_4$ represents a saturated aliphatic hydrocarbon radical containing from 6 to 24 carbon atoms, $R_5$ represents a phenyl radical and X is an integer of from 1 to 3 inclusive.

4. A polymeric vinyl halide composition resistant to the deleterious effect of ultraviolet light which comprises a polymer of vinyl halide plasticized with from 30 to 60 parts by weight per 100 parts by weight of polymer of a mixture containing from 30 to 70% of an aryl dialkyl phosphate of the formula

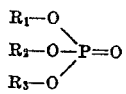

wherein $R_1$ is an aryl hydrocarbon radical containing from 6 to 20 carbon atoms, and $R_2$ and $R_3$ are alkyl hydrocarbon radicals containing up to 20 carbon atoms, and correspondingly 70 to 30% of an aryl alkane sulfonate of the formula

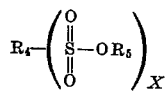

wherein $R_4$ represents a saturated aliphatic hydrocarbon radical containing from 6 to 24 carbon atoms, $R_5$ represents a phenyl radical and X is an integer of from 1 to 3 inclusive.

5. A polymeric vinyl chloride composition resistant to the deleterious effect of ultraviolet light which comprises a polymer of vinyl chloride plasticized with from 30 to 60 parts by weight per 100 parts by weight of polymer of a mixture containing from 30 to 70% of an alkyl diaryl phosphate of the formula

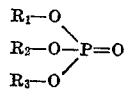

wherein $R_1$ is an alkyl hydrocarbon radical containing up to 20 carbon atoms, and $R_2$ and $R_3$ are aryl hydrocarbon radicals containing from 6 to 20 carbon atoms, and correspondingly from 70 to 30% of an aryl alkane sulfonate of the formula

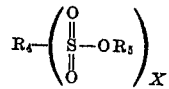

wherein $R_4$ represents a saturated aliphatic hydrocarbon radical containing from 6 to 24 carbon atoms, $R_5$ represents a phenyl radical and X is an integer of from 1 to 3 inclusive.

6. The composition of claim 5 wherein the alkane portion of the phenyl alkane sulfonate contains from 6 to 12 carbon atoms.

7. The composition of claim 6 wherein the alkyl diaryl phosphate is 2-ethylhexyl diphenyl phosphate.

8. A polyvinyl chloride composition resistant to the deleterious effect of ultraviolet light which comprises polyvinyl chloride plasticized with from 30 to 60 parts by weight per 100 parts by weight of polymer of a mixture containing from 30 to 70% of an alkyl diaryl phosphate of the formula

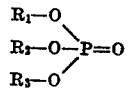

wherein $R_1$ is an alkyl hydrocarbon radical containing up to 20 carbon atoms, and $R_2$ and $R_3$ are aryl hydrocarbon radicals containing from 6 to 20 carbon atoms, and correspondingly from 70 to 30% of an aryl alkane sulfonate of the formula

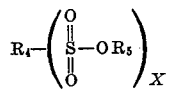

wherein $R_4$ represents a saturated aliphatic hydrocarbon radical containing from 6 to 24 carbon atoms, $R_5$ represents a phenyl radical and X is an integer of from 1 to 3 inclusive.

9. The composition of claim 8 wherein the alkane portion of the phenyl alkane sulfonate contains from 6 to 12 carbon atoms.

10. The composition of claim 9 wherein the alkyl diaryl phosphate is 2-ethylhexyl diphenyl phosphate.

References Cited in the file of this patent

UNITED STATES PATENTS

| | | |
|---|---|---|
| 2,557,089 | Gamrath et al. | June 19, 1951 |
| 2,694,689 | Gamrath et al. | Nov. 16, 1954 |
| 2,739,978 | Gamrath et al. | Mar. 27, 1956 |

OTHER REFERENCES

Modern Plastics, volume 24, No. 2, March 1947, pages 154, 155, 156, 192, 194.